United States Patent
Carlsson et al.

(10) Patent No.: US 7,289,218 B2
(45) Date of Patent: Oct. 30, 2007

(54) OPTICAL COMPONENT FOR DIRECTING ELECTROMAGNETIC RADIATION

(75) Inventors: Magnus Carlsson, Malmö (SE); Thomas Nilsson, Malmö (SE); Pär Ragnarsson, Lund (SE); Lars-Åke Larsson, Lund (SE); Jörgen Malmborg, Lund (SE)

(73) Assignee: Hemocue AB, Ängelholm (SE)

( * ) Notice: Subject to any disclaimer, the term of this patent is extended or adjusted under 35 U.S.C. 154(b) by 251 days.

(21) Appl. No.: 10/514,629

(22) PCT Filed: May 28, 2003

(86) PCT No.: PCT/SE03/00872

§ 371 (c)(1),
(2), (4) Date: Nov. 17, 2004

(87) PCT Pub. No.: WO04/001460

PCT Pub. Date: Dec. 31, 2003

(65) Prior Publication Data

US 2005/0231833 A1     Oct. 20, 2005

(30) Foreign Application Priority Data

Jun. 24, 2002   (SE) .................................. 0201919

(51) Int. Cl.
*G02B 5/00*     (2006.01)
*G01N 21/27*   (2006.01)

(52) U.S. Cl. .................... 356/436; 356/39; 359/636; 359/639

(58) Field of Classification Search ................ 359/618, 359/629, 636, 639, 640, 834; 353/98, 99; 362/231, 234
See application file for complete search history.

(56) References Cited

U.S. PATENT DOCUMENTS

| | | | |
|---|---|---|---|
| 3,741,623 A | 6/1973 | Mihalik | |
| 5,125,747 A | 6/1992 | Sayegh et al. | |
| 5,155,628 A * | 10/1992 | Dosmann | 359/640 |
| 6,176,586 B1 | 1/2001 | Hirose et al. | |
| 6,384,972 B1 | 5/2002 | Chuang | |
| 6,545,814 B2 * | 4/2003 | Bartlett et al. | 359/636 |

FOREIGN PATENT DOCUMENTS

| | | |
|---|---|---|
| EP | 0 359 461 | 3/1990 |
| EP | 0 309 344 A2 | 10/1990 |
| EP | 0 681 166 | 11/1995 |

* cited by examiner

OTHER PUBLICATIONS

European Office Action dated Feb. 21, 2007 (1st page only).

*Primary Examiner*—F. L. Evans
(74) *Attorney, Agent, or Firm*—Buchanan Ingersoll & Rooney PC

(57) ABSTRACT

A passive optical component directs first electromagnetic radiation incident on the component in a first direction and second electromagnetic radiation incident on the component in a second direction to a mutual direction. The optical component comprises an interacting surface which is arranged to interact with said first and second electromagnetic radiation. The interacting surface comprises first portions, each having a surface extending in a third direction, which is essentially perpendicular to the mutual direction, and second portions, each having a surface extending in a fourth direction. The optical component reflects essentially all the first electromagnetic radiation and transmits at least a significant portion of the second electromagnetic radiation for directing the first and the second electromagnetic radiation to a mutual direction. An optical system and a method using the passive optical component are also shown.

27 Claims, 3 Drawing Sheets

OPTICAL COMPONENT FOR DIRECTING ELECTROMAGNETIC RADIATION

TECHNICAL FIELD OF THE INVENTION

The present invention relates to a passive optical component for directing first electromagnetic radiation incident on the component in a first direction and second electromagnetic radiation incident on the component in a second direction to a mutual direction. The present invention also relates to an optical system and a method using such a passive optical component.

BACKGROUND OF THE INVENTION

In several applications there is a need for emitting electromagnetic radiation containing two different wavelengths towards a specific point. Such an application may be a spectrophotometric analysis, where a sample is irradiated with the two different wavelengths and the interaction of the electromagnetic radiation and the sample is registered. The two different wavelengths are needed, since properties of the sample may be determined by establishing a ratio between the interactions of the sample with the different wavelengths.

There are a number of solutions to the need for emitting electromagnetic radiation containing two wavelengths towards a sample. According to a first solution, the sample is first irradiated by radiation of a first wavelength and then irradiated by radiation of a second wavelength. This may be accomplished by for example selectively activating a mirror for optionally directing the first radiation or the second radiation towards the sample to be irradiated. However, this requires a mechanically moveable component, which sets high demands on the stability of the setup and also makes the setup complex.

According to a second solution, the sample is irradiated by different wavelengths in different positions. However, then the radiation of different wavelengths will not interact with the same parts of the sample. Therefore, differing properties of the different positions of the sample, such as differing thickness of the sample, could affect the result of the analysis.

According to a third solution, the sample may be irradiated by a source which emits a wide spectrum of wavelengths. However, if two specific wavelengths are needed, there may not be any source that emits these two wavelengths.

According to a fourth solution, a beam splitter may be used. Radiation incident on a beam splitter will be partly reflected and partly transmitted. Radiation of a first wavelength may then incide on one side of the beam splitter and radiation of a second wavelength may incide on the other side of the beam splitter. Part of the radiation of the first wavelength will then be transmitted through the beam splitter and will be collimated with the part of the radiation of the second wavelength that is reflected by the beam splitter. However, only 50% of the combined radiation intensity of the wavelengths may be used in the measurement, since the rest of the radiation is directed by the beam splitter-away from the sample position.

According to a fifth solution, an active component may be used. The active component acts in a similar manner as the beam splitter. However, by applying a voltage over the active component, it may reflect 100% of the radiation incident on one side. When the voltage is turned off, the active component transmits 50% of the radiation incident on the other side. The active component requires an extra electric circuit for its activation. This makes the design of an optical setup using the active component more complex. Further, a measurement requires switching on and off the voltage applied to the active component.

SUMMARY OF THE INVENTION

It is an object of the invention to provide an optical component, which may overcome the above-identified problems and which provides better optical characteristics for radiation from different directions without the need of any active manipulation of the optical setup.

The object of the invention is achieved by a passive optical component. The object of the invention is also achieved by an optical system and a method, wherein the inventive idea is used for spectrophotometric analysis.

According to the invention, a passive optical component is provided for directing first electromagnetic radiation incident on the component in a first direction and second electromagnetic radiation incident on the component in a second direction to a mutual direction. The optical component reflects essentially all the first electromagnetic radiation and transmits at least a significant portion of the second electromagnetic radiation for directing the first and the second electromagnetic radiation to a mutual direction.

In the context of this application, the term "passive optical component" should be interpreted as any optical component that has constant optical characteristics, i.e. the optical component should not need any outer influence in order to present its optical characteristics. Further, as used herein the phrase "reflect essentially all radiation" means that most of the radiation is reflected but losses due to e.g. surface reflection or absorption may occur. Also, the phrase "transmit at least a significant portion of radiation" should be interpreted as that a substantial amount of the radiation is transmitted, i.e. the portion need not be 50% but should be large enough to be clearly detectable.

The passive optical component according to the invention allows more radiation to be directed towards a specific point than is allowed by conventional devices. Further, the passive optical component provides the funcionality through a small size component, which involves no moveable parts, and therefore is robust.

Preferably, there is provided a passive optical component comprising an interacting surface which is arranged to interact with electromagnetic radiation. The interacting surface has first portions, each having a surface extending in a third direction and second portions, each having a surface extending in a fourth direction. The first and second portions may be so arranged that essentially all radiation incident on one side of the interacting surface from the first direction and a significant portion of radiation incident on the other side of the interacting surface from the second direction will be directed by the interacting surface to a mutual direction.

By intelligent arrangement of the first portions relative the first direction of incident radiation, the interacting surface seen from the first direction may appear to be consisting only of the second portions. This may be accomplished by arranging the first portions such that the surfaces of the first portions extend in a direction parallel to the first direction of incident radiation. Thus, all the radiation incident from the first direction will be reflected off the surface of the second portions. Meanwhile, the interacting surface seen from the second direction may appear to consist of both the first and the second portions. Thus, the radiation incident from the second direction may be transmitted through the first portions of the interacting surface into the same direction as the reflected radiation from the first direction.

The first portions may be arranged such that the third direction is essentially perpendicular to the mutual direction. Then, the radiation incident from the second direction may incide on the first portions with an angle of incidence of 90°. This implies that essentially all of this radiation inciding on a first portion will then be transmitted without being deflected.

According to one embodiment, the optical component reflects the first electromagnetic radiation through internal reflection. Then, the second portions of the interacting surface of the optical component need not have a surface which is processed for optimal reflection properties. Instead, the total internal reflection which may occur when radiation passes from a thicker to a thinner medium is used. When the angle of incidence is larger than a critical angle all radiation incident on the second portions is reflected through total internal reflection.

Radiation directed out from the optical component will form a checked pattern, since the radiation incident on the interacting surface will not impinge on a continuous surface. According to one embodiment, all first portions are of equal size and all second portions are of equal size. This implies that the radiation directed out from the optical component will form a uniform pattern.

The first portions and the second portions may be of equal size. This implies that all areas of the checked pattern will be equally large. Further, half of the radiation incident from the second direction will impinge on a first portion of the interacting surface. Thus, 50% of the radiation incident from the second direction will be transmitted.

According to one embodiment, an angle between the third and the fourth directions is essentially 45°. This implies that the radiation incident from the first direction, while being parallel to the third direction, in which the surfaces of the first portions extend, will be deflected through reflection into the same direction as the radiation incident from the second direction is transmitted in. Thus, the interacting surface seen from the first direction will appear to be consisting only of the second portions.

The passive optical component may further comprise a plane input surface extending in a direction perpendicular to the third direction. The radiation incident from the first direction may impinge the input surface and be transmitted through the optical component to the interacting surface. When the input surface extends in a direction perpendicular to the third direction, the radiation incident from the first direction may impinge perpendicularly to this input surface while the first direction is parallel to the third direction. Then, all radiation incident from the first direction will be transmitted through the input surface without deflection.

The passive optical component may further comprise a plane output surface extending in a direction perpendicular to the mutual direction. This implies that all the radiation propagating in the mutual direction after having interacted with the interacting surface will leave the optical component through the output surface without being deflected.

The interacting surface may extend from a first end of the output surface to a first end of the input surface. Thus, all radiation incident on the input surface in the first direction will impinge on the interacting surface and all radiation leaving the interacting surface in the mutual direction will leave the optical component through the output surface.

A second end of the input surface may be connected to a second end of the output surface. Thus, the input surface, the interacting surface, and the output surface will form an essentially triangular cross-section. This implies that the optical component will have a simple shape.

The passive optical component may be essentially formed of a plastic material. The optical component may easily be shaped to a desired form in a plastic material. Further, a plastic material having required optical characteristics may easily be found.

According to an aspect of the invention, an optical system is provided for spectrophotometric analysis. The optical system comprises means for providing first and second electromagnetic radiation of a first and a second wavelength, respectively. The optical system further comprises a passive optical component for directing said first and said second electromagnetic radiation in a mutual direction. The passive optical component comprises an interacting surface which is arranged to interact with said first and second electromagnetic radiation. The interacting surface comprises first portions, each having a surface extending in a first direction, which is essentially perpendicular to the mutual direction, and second portions, each having a surface extending in a second direction. Thus, the passive optical component reflects essentially all of said first electromagnetic radiation and transmits at least a significant portion of the second electromagnetic radiation for directing the first and the second electromagnetic radiation in the mutual direction.

According to another aspect of the invention, a method is provided for spectrophotometric analysis of a sample. The method comprises the steps of emitting first electromagnetic radiation of a first wavelength and second electromagnetic radiation of a second wavelength, directing the first electromagnetic radiation and the second electromagnetic radiation to a mutual direction by means of a passive optical component. The passive optical component comprises an interacting surface which is arranged to interact with said first and second electromagnetic radiation. The interacting surface comprises first portions, each having a surface extending in a first direction, which is essentially perpendicular to the mutual direction, and second portions, each having a surface extending in a second direction. Thus, the passive optical component reflects essentially all of said first electromagnetic radiation and transmits at least a significant portion of said second electromagnetic radiation for directing the first and the second electromagnetic radiation to the mutual direction. The method further comprises the step of detecting electromagnetic radiation propagating in the mutual direction after it has been transmitted through the sample.

A spectrophotometric analysis using this optical system or by means of this method may utilize a large portion of the emitted electromagnetic radiation without the need for any moveable parts or any change in the optical setup during the analysis. This implies that the system is very easy to use and robust. Thus, it is suited for domestic use.

The system and the method take advantage of the excellent optical characteristics of the passive optical component. The optical system may be used for irradiating a sample with the first and the second electromagnetic radiation simultaneously or separately.

According to one embodiment, the means for providing first and second electromagnetic radiation comprises a first and a second source, which emit the first and second electromagnetic radiation, respectively. This implies that sources which are designed for emitting only the wavelengths that are needed for the spectrophotometric analysis may be used. Thus, the radiation emitted by the sources may be used effeciently.

According to another embodiment, the means for providing first and second electromagnetic radiation comprises a source, which emits both the first and the second electromagnetic radiation.

The means for providing first and second electromagnetic radiation may further comprise means for splitting the electromagnetic radiation of the source into a first and a second path and filters for transmitting the first electromagnetic radiation of the first path and the second electromagnetic radiation of the second path. Hereby, the radiation of the first and the second wavelengths may be extracted from the radiation emitted by the source and may be directed in different directions towards the passive optical component.

The optical system may further comprise a diffusor for smoothing out the radiation intensity over a cross-section of the electromagnetic radiation propagating in the mutual direction. The electromagnetic radiation that leaves the passive optical component propagating in the mutual direction may not have a homogenous radiation intensity over its cross-section. It may be therefore be suitable to lead the radiation through a diffusor.

The method for spectrophotometric analysis may be used for determining an amount of a chemical substance in a body fluid. The chemical substance may typically be any one of glucose, hemoglobin, albumin, creatinine, cholesterol, HDL-cholesterol, triglycerides, or CRP. Further, the body fluid may be any one of blood, plasma, serum, and urine. Thus, the method may e.g. be used for determining glucose in a blood sample. The method for spectrophotometric analysis is so simple that it is suitable for domestic use. Thus, it may provide a fast method, which a diabetic may use for determining the glucose content in his/her blood.

BRIEF DESCRIPTION OF THE DRAWINGS

The present invention will now be described in more detail by way of example referring to the appended drawings.

DETAILED DESCRIPTION OF A PREFERRED EMBODIMENT

Figure 1:
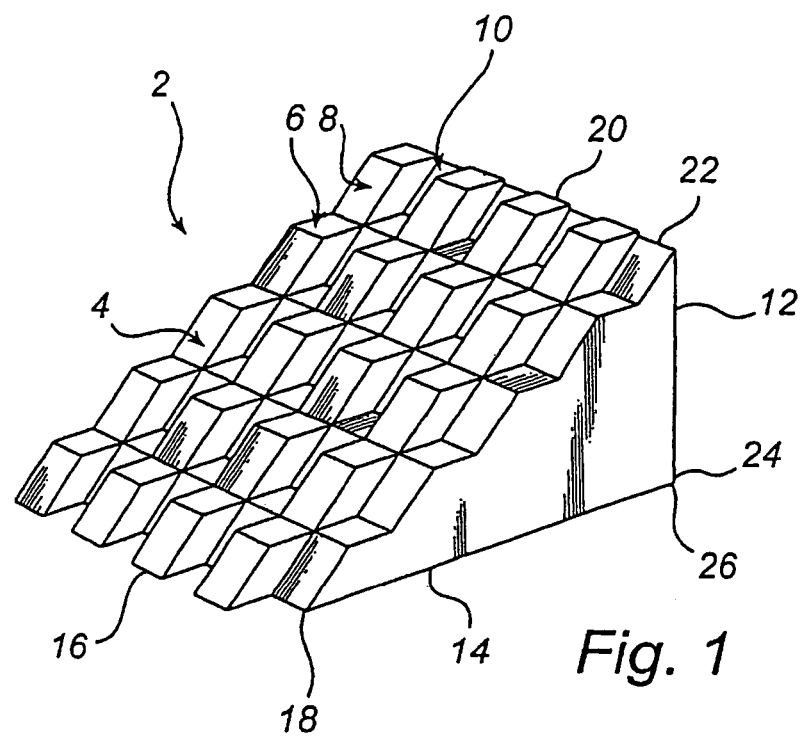
FIG. 1 is a perspective view of an optical component according to the invention.

Referring to FIG. 1, an optical component 2 according to the invention will be described. The optical component 2 comprises an interacting surface 4, which is intended to interact with electromagnetic radiation impinging on the optical component 2. The interacting surface 4 is formed according to a repetitive pattern. The interacting surface 4 comprises first portions 6 having a surface extending in a first direction and second portions 8 having a surface-extending in a second direction. The interacting surface 4 is constituted of alternating first portions 6 and second portions 8. The first and the second directions form an angle of 45°.

These portions 6, 8 form a "stair-like" shape of the interacting surface 4. Several "stair-like" parts are formed side by side in the interacting surface 4. Two adjacent "stair-like" parts are displaced in depth to each other. Thus, third portions 10 are formed between the "stair-like" parts. These third portions 10 have a surface, which is perpendicular to both the surface of the first portions 6 and the surface of the second portions 8.

Figure 2:
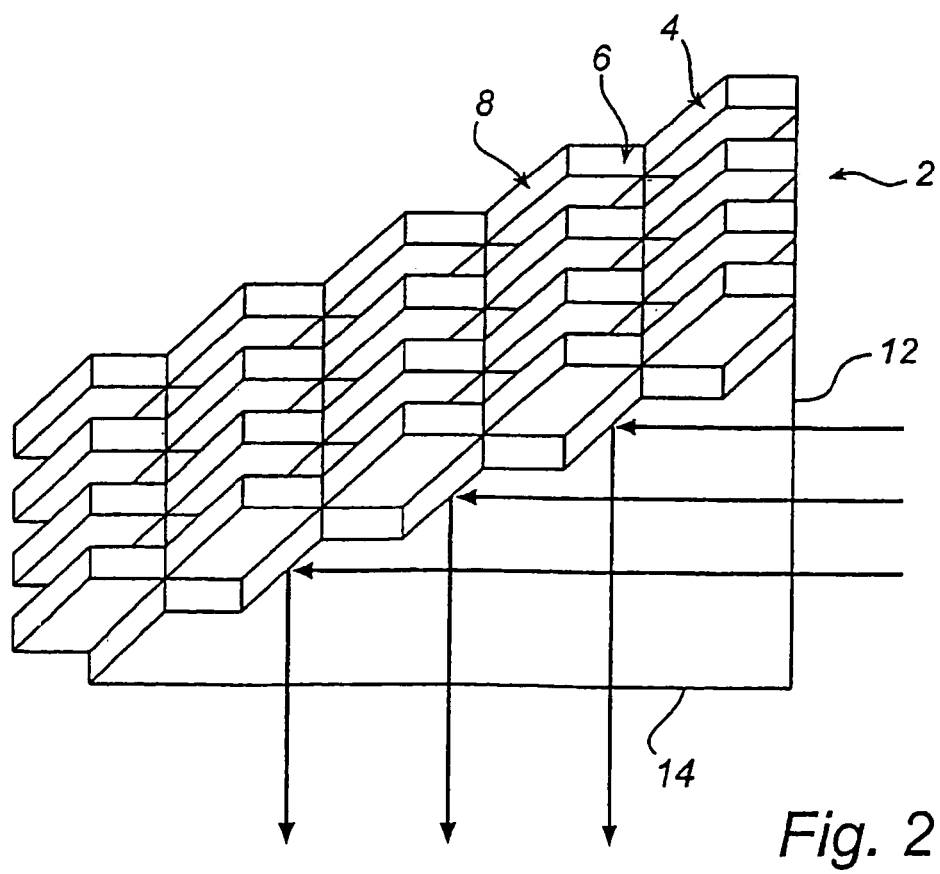
FIG. 2 is a side view of the optical component of FIG. 1 illustrating the path for radiation from a first direction.
Figure 3:
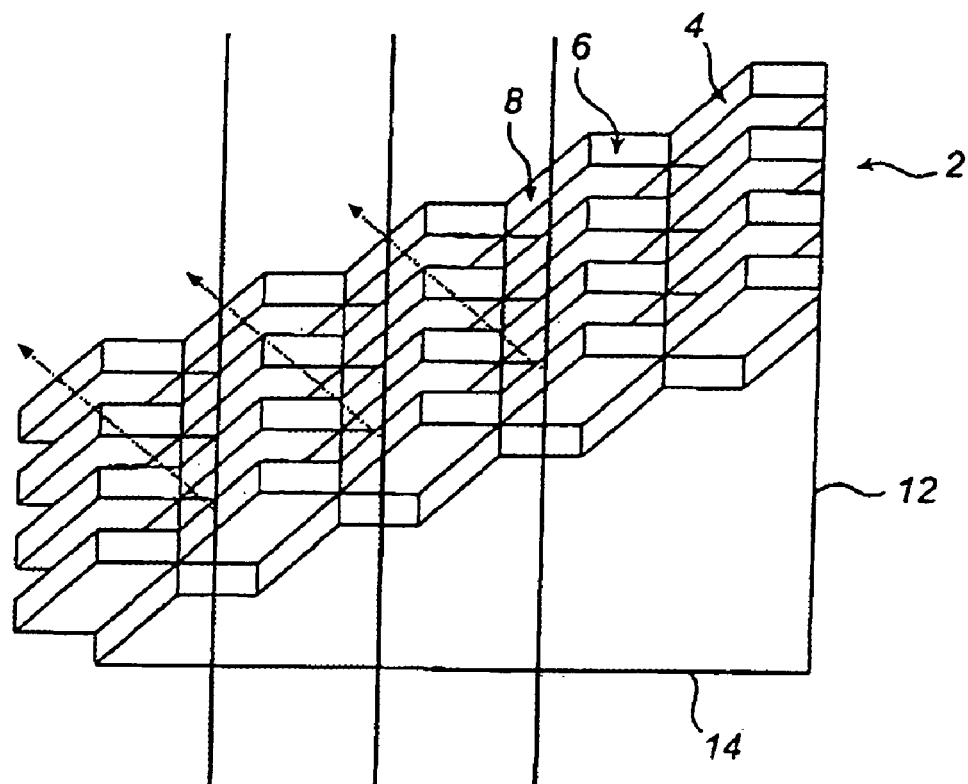
FIG. 3 is a side view of the optical component of FIG. 1 illustrating the path for radiation from a second direction.

As is best seen in FIGS. 2 and 3, the optical component 2 further comprises an input surface 12. This input surface 12 is perpendicular to the first portions 6. The optical component 2 also comprises an output surface 14, which is parallel to the first portions 6. The interacting surface 4 extends from a first end 16, in which it is connected to a first end 18 of the output surface 14, to a second end 20, in which it is connected to a first end 22 of the input surface 12. The input surface 12 is connected in a second end 24 to a second end 26 of the output surface 14. The input surface 12 and the output surface 14 form a right angle at their connection. A cross-section of the input surface 12, the output surface 14, and the interacting surface 4 form an essentially right angle triangle.

The optical component 4 may be formed in one piece. It is formed of a material that has optical characteristics, which are suitable for the electromagnetic radiation that it is to interact with. The optical component 4 may be formed of a plastic material that has the required optical characteristics. However, the optical component 4 may also be formed of glass.

Referring now to FIG. 2, the interaction of the optical component 2 with first electromagnetic radiation incident from a third direction will be explained. The first electromagnetic radiation impinges perpendicularly on the input surface 12 of the optical component 2. The perpendicular incidence implies that essentially all radiation will be transmitted through the input surface 12 without being deflected. The first electromagnetic radiation propagates in a third direction, which is parallel to the first direction. Thus, the first electromagnetic radiation will not impinge on the first portions 6 of the interacting surface 4. All the first electromagnetic radiation propagating through the optical component 2 will interact with the second portions 8 of the optical component 2. Since these second portions 8 are angled 45° to the first portions 6 and thus to the propagating direction of the first electromagnetic radiation, the first electromagnetic radiation will be deflected 90° by reflection at the second portions. The material of the optical component 2 has a refractive index that is large enough to cause total internal reflection for the first electromagnetic radiation impinging on the second portions 8.

Referring to FIG. 3, the interaction of the optical component 2 with second electromagnetic radiation incident from a fourth direction will be explained. The second electromagnetic radiation is incident on the interacting surface 4 of the optical component 2. The second electromagnetic radiation impinges perpendicularly on the first portions 6 of the interacting surface 4. The perpendicular incidence implies that essentially all radiation will be transmitted through the first portions 6 without being deflected. Part of the second electromagnetic radiation will impinge on the second portions 8 of the interacting surface. This part of the second electromagnetic radiation will be reflected or be deflectedly transmitted. However, the part of the second electromagnetic radiation which impinges on the first portions 6 will propagate after being transmitted through the surface in the same directin as the first electromagnetic radiation has after it has interacted with the second portions 8. Thus, the passive optical-component provides a possibility of directing first electromagnetic radiation incident on the component in a first direction and second electromagnetic radiation incident on the component in a second direction to a mutual direction. The optical component 2 directs essentially all the first electromagnetic radiation to the mutual direction. Only the part of the second electromagnetic radiation that is incident on the first portions 6 is directed in the mutual direction. Thus, if the first portions 6 and the second portions 8 are equally large, 50% of the second electromagnetic radiation will be directed in the mutual direction.

Both the first and the second electromagnetic radiation directed in the mutual direction will form a checkered pattern in their cross-section, the pattern corresponding to the first 6 and second portions 8. Since neither the first nor the second electromagnetic radiation is incident on a continuous surface, the radiation outputted from the interacting surface 4 will not be continuous over its cross-section. Thus, the cross-section of the first electromagnetic radiation will vary between a high intensity in areas corresponding to the interaction with the second portions 8 and no intensity at all in areas corresponding to the interaction with the first portions 6, and vice versa for the second electromagnetic radiation. The pattern of the cross-section is dependent on the design of the first 6 and the second portions 8.

Figure 4:
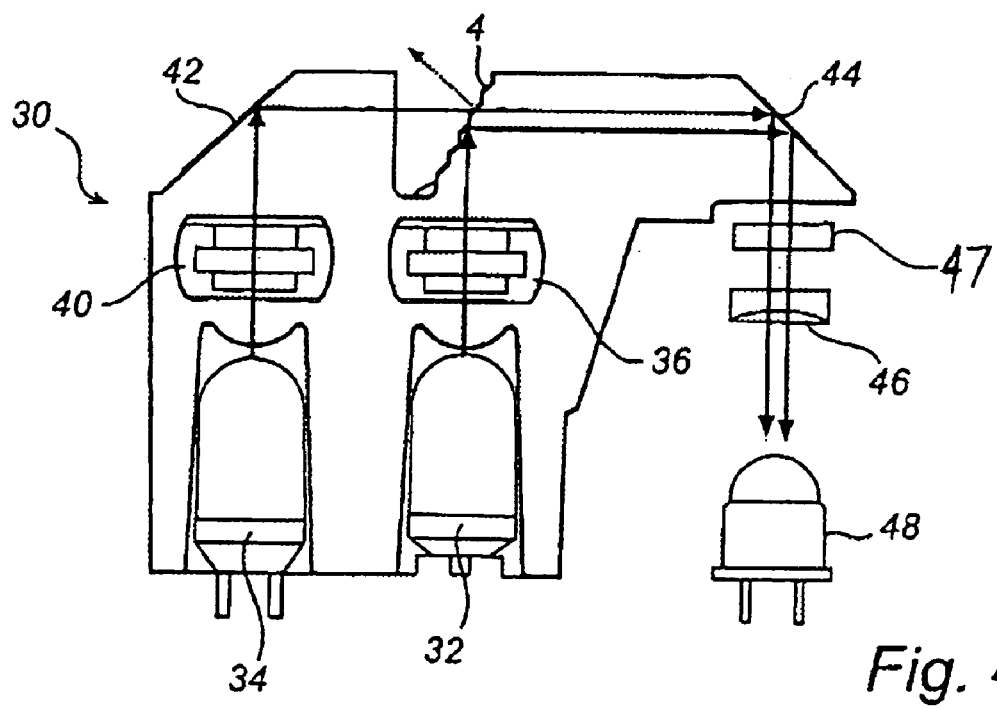
FIG. 4 is a schematic view of an optical system according to the invention.

Referring now to FIG. 4, an optical system 30 using the optical component 2 will be explained. The optical system 30 comprises a first and a second electromagnetic radiation sources 32, 34, in the form of light emitting diodes (LEDs) emitting electromagnetic radiation of two different wavelengths. The first electromagnetic radiation source 32 emits first electromagnetic radiation of a first wavelength. The first electromagnetic radiation passes a collimator 36 and is then incident on the interactive surface 4. The second electromagnetic source 34 emits second electromagnetic radiation of a second wavelength. The second electromagnetic radiation passes a collimator 40 and is then reflected by a reflective surface 42 towards the interactive surface 4 of the optical component 2.

The first electromagnetic radiation will interact with the optical component 2 according to the interaction described above with reference to FIG. 2. The interacting surface 4 of the optical component 2 is in contact with air so that the first electromagnetic radiation will be totally reflected in the second portions of the interacting surface 4. The second electromagnetic radiation will interact with the optical component according to the interaction described above with reference to FIG. 3. Thus, the first and the second electromagnetic radiation are directed into a mutual direction. The first and second electromagnetic radiation outputted from the optical component are then reflected in a reflective surface 44 towards a sample. The first and the second electromagnetic radiation irradiate the same portion of the sample 46.

The optical system 30 further comprises a detector 48. The detector 48 detects radiation that has been transmitted through the sample 46. Since the first and the second electromagnetic radiation propagate in a mutual direction, they will interact with the same parts of the sample 46. The detected radiation is then analyzed, whereby an amount of a constituent in the sample 46 may be determined.

The optical system 30 may comprise a diffusor 47 arranged in the radiation path after the optical component 2. The diffusor 47 will smooth out the intensity distribution of the electromagnetic radiation. Thus, the checkered pattern of the electromagnetic radiation will be diffused into a more continuous pattern. The smooth distribution of the intensity of the electromagnetic radiation will provide a more uniform interaction between the electromagnetic radiation and the sample 46 over the cross-section of the radiation.

A larger portion of the first electromagnetic radiation than of the second electromagnetic radiation is directed into the mutual direction by the optical component 2. The second source 34 emitting the second electromagnetic radiation may be stronger than the first source 32 to compensate for this. However, it may be desired that the radiation of the first wavelength has a larger intensity than the radiation of the second wavelength, e.g. if the radiation of the second wavelength is used for the purpose of calibration.

Figure 5:
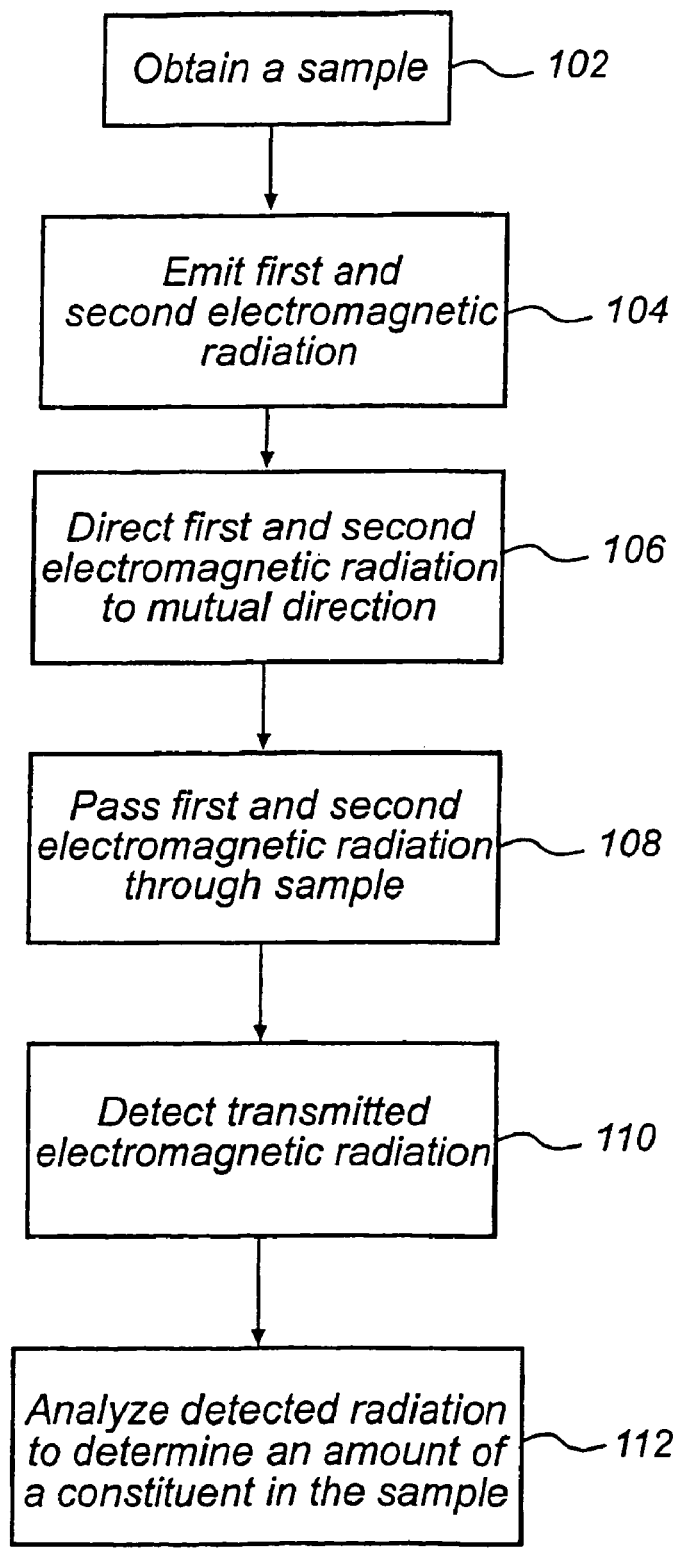
FIG. 5 is a flow chart illustrating a method according to the invention.

Referring to FIG. 5, a method for spectrophotometric analysis of a sample 46 will now be described. First, a sample 46 that is to be analyzed is obtained, step 102, and prepared to suit the analysis. The sample is analyzed using the optical system 30 described above.

Thus, first electromagnetic radiation of a first wavelength and second electromagnetic radiation of a second wavelength are emitted, step 104. The first electromagnetic radiation and the second electromagnetic radiation are directed to a mutual direction by means of the passive optical component, step 106. The first and the second electromagnetic radiation are then passed through the sample 46, step 108.

Next, the electromagnetic radiation that has been transmitted through the sample 46 is detected, step 110. Then, the detected amounts of radiation is analyzed and an amount of a constituent in the sample 46 is determined, step 112.

The sample 46 may e.g. be a blood sample. Thus, the determined amount may be an amount of glucose in the blood. The optical system 30 may be so simply designed that a diabetic may use it at home for determining his or her glucose value.

Of course, other measurements are possible. The spectrophotometric analysis may be used for determining an amount of any substance suspended in a liquid.

It should be emphasized that the preferred embodiment described herein is in no way limiting and that many alternative embodiments are possible within the scope of protection defined by the appended claims. For example, the pattern formed by the first and the second portions may be varied in infinite ways. If the first portions are made larger than the second portions, a larger part of the second electromagnetic radiation will be transmitted through the interacting surface. Further, the angle between the first and the second portions may be varied. In this case, the angle of incidence of the first electromagnetic radiation will also have to be changed, so that the first electromagnetic radiation is reflected into the mutual direction. However, this implies that the first electromagnetic radiation will not propagate in parallel with the first portions. Thus, a small part of the first electromagnetic radiation will be lost through interaction with the first portions.

The optical system may be arranged such that the electromagnetic radiation of the two sources is emitted at the same time or sequentially. The sources need not emit a specific, discrete wavelength, instead they may emit wavelengths of different intervals. Further, only one source may be used. In this case, the electromagnetic radiation is divided into two paths. In a first path, a first wavelength is passed, and in a second path a second wavelength is passed. The electromagnetic radiation of the first path and of the second path are then fed to the optical component in a similar way as the first and second electromagnetic radiation described above.

The invention claimed is:

1. A passive optical component for directing first electromagnetic radiation incident on the component in a first direction and second electromagnetic radiation incident on the component in a second direction to a mutual direction, wherein:
an interacting surface which is arranged to interact with said first and second electromagnetic radiation, said interacting surface comprising
first portions, each having a surface extending in a third direction, which is essentially perpendicular to the mutual direction, and
second portions, each having a surface extending in a fourth direction,
whereby the optical component reflects essentially all the first electromagnetic radiation and the optical component transmits at least a significant portion of the second electromagnetic radiation for directing the first and the second electromagnetic radiation to a mutual direction.

2. The passive optical component according to claim 1, wherein the optical component reflects the first electromagnetic radiation through internal reflection.

3. The passive optical component according to claim 1, wherein all first portions are of equal size and all second portions are of equal size.

4. The passive optical component according to claim 1, wherein the first portions and the second portions are of equal size.

5. The passive optical component according to claim 4, wherein an angle between the third and the fourth directions is essentially 45°.

6. The passive optical component according to claim 1, further comprising a plane input surface extending in a direction perpendicular to the third direction.

7. The passive optical component according to claim 6, further comprising a plane output surface extending in a direction perpendicular to the mutual direction.

8. The passive optical component according to claim 7, wherein the interacting surface extends from a first end of the output surface to a first end of the input surface.

9. The passive optical component according to claim 8, wherein a second end of the input surface is connected to a second end of the output surface.

10. The passive optical component according to claim 1, said component being essentially formed of a plastic material.

11. The passive optical component according to claim 2, wherein all first portions are of equal size and all second portions are of equal size.

12. The passive optical component according to claim 2, wherein the first portions and the second portions are of equal size.

13. The passive optical component according to claim 3, wherein the first portions and the second portions are of equal size.

14. The passive optical component according to claim 11, wherein the first portions and the second portions are of equal size.

15. The passive optical component according to claim 1, wherein said first and second portions form a stair-like shape.

16. The passive optical component according to claim 15, wherein at least two stair-like shaped portions are formed side by side, and adjacent stair-like shaped portions are off-set in depth from one another.

17. An optical system for spectrophotometric analysis comprising means for providing first and second electromagnetic radiation of a first and a second wavelength, respectively, wherein:
a passive optical component for directing said first and said second electromagnetic radiation in a mutual direction, said passive optical component comprising an interacting surface which is arranged to interact with said first and second electromagnetic radiation, said interacting surface comprising
first portions, each having a surface extending in a third direction, which is essentially perpendicular to the mutual direction, and
second portions, each having a surface extending in a fourth direction,
whereby the optical component reflects essentially all of said first electromagnetic radiation and transmits at least a significant portion of the second electromagnetic radiation for directing the first and the second electromagnetic radiation in the mutual direction.

18. The optical system according to claim 17, wherein the means for providing first and second electromagnetic radiation comprises a first and a second source, which emit the first and second electromagnetic radiation, respectively.

19. The optical system according to claim 17, further comprising a diffusor for smoothing out the radiation intensity over a cross-section of the electromagnetic radiation propagating in the mutual direction.

20. The optical system according to claim 18, further comprising a diffusor for smoothing out the radiation intensity over a cross-section of the electromagnetic radiation propagating in the mutual direction.

21. The optical system according to claim 17, wherein said first and second portions form a stair-like shape.

22. The optical system according to claim 21, wherein at least two stair-like shaped portions are formed side by side, and adjacent stair-like shaped portions are off-set in depth from one another.

23. A method for spectrophotometric analysis of a sample, said method comprising the steps of:
emitting first electromagnetic radiation of a first wavelength and second electromagnetic radiation of a second wavelength,
directing the first electromagnetic radiation and the second electromagnetic radiation to a mutual direction by means of a passive optical component, said passive optical component comprising an interacting surface which is arranged to interact with said first and second electromagnetic radiation, said interacting surface comprising first portions, each having a surface extending in a first direction, which is essentially perpendicular to the mutual direction, and second portions, each having a surface extending in a second direction, whereby the optical component reflects essentially all of said first electromagnetic radiation and transmits at least a significant portion of said second electromagnetic radiation for directing the first and the second electromagnetic radiation to the mutual direction, and
detecting electromagnetic radiation propagating in the mutual direction after it has been transmitted through the sample.

24. The method according to claim 23 for determining an amount of a chemical substance in a body fluid.

25. The method according to claim 24, wherein the chemical substance is one in the group of glucose, hemoglobin, albumin, creatinine, cholesterol, HDL-cholesterol, triglycerides, and CRP.

26. The method according to claim 23, wherein the body fluid is one in the group of blood, plasma, serum, and urine.

27. The method according to claim 24, wherein the body fluid is one in the group of blood, plasma, serum, and urine.

* * * * *